(12) United States Patent
Deen et al.

(10) Patent No.: US 11,044,505 B2
(45) Date of Patent: Jun. 22, 2021

(54) DIGITAL RIGHTS MANAGEMENT FOR CINEMA SYSTEMS

(71) Applicant: NBCUNIVERSAL MEDIA, LLC, Universal City, CA (US)

(72) Inventors: Robert Glenn Deen, Universal City, CA (US); Michael S. Wilkinson, Newhall, CA (US); Anthony C. Anderson, Castaic, CA (US); Andrew Lucas, Universal City, CA (US)

(73) Assignee: NBCUNIVERSAL MEDIA, LLC, Universal City, CA (US)

( * ) Notice: Subject to any disclaimer, the term of this patent is extended or adjusted under 35 U.S.C. 154(b) by 0 days.

(21) Appl. No.: 16/714,563

(22) Filed: Dec. 13, 2019

(65) Prior Publication Data

US 2020/0245010 A1 Jul. 30, 2020

Related U.S. Application Data

(60) Provisional application No. 62/798,958, filed on Jan. 30, 2019.

(51) Int. Cl.
| | |
|---|---|
| *H04N 7/16* | (2011.01) |
| *H04N 21/254* | (2011.01) |
| *H04L 9/32* | (2006.01) |
| *H04N 21/8358* | (2011.01) |
| *H04N 21/258* | (2011.01) |

(52) U.S. Cl.
CPC ....... *H04N 21/2541* (2013.01); *H04L 9/3213* (2013.01); *H04N 21/25816* (2013.01); *H04N 21/8358* (2013.01)

(58) Field of Classification Search
None
See application file for complete search history.

(56) References Cited

U.S. PATENT DOCUMENTS

| | | | | |
|---|---|---|---|---|
| 8,706,802 B1* | 4/2014 | Dayan | ................ | H04L 67/42 709/203 |
| 2003/0202661 A1* | 10/2003 | Rodriguez | ....... | H04N 21/63345 380/239 |
| 2003/0204851 A1* | 10/2003 | Powell | ............... | H04N 21/2402 725/63 |
| 2006/0071824 A1* | 4/2006 | Kim | ................... | H04N 21/4104 341/50 |
| 2006/0133644 A1* | 6/2006 | Wells | ................. | G06Q 20/3829 382/100 |

(Continued)

*Primary Examiner* — William J Kim
(74) *Attorney, Agent, or Firm* — Lee, Hong, Degerman, Kang & Waimey (57) ABSTRACT

Systems and methods for controlling transmission of digital content stored at a server are disclosed. According to at least one embodiment, a method includes: receiving, at the server, session information from a device, the session information including information for authorizing the server to decrypt the digital content for transmission to a playback device; determining, at the server, to decrypt the digital content for the transmission to the playback device, based on the session information; decrypting, at the server, the digital content for the transmission to the playback device, in response to determining to decrypt the digital content; and transmitting, at the server, the decrypted digital content to the playback device.

19 Claims, 5 Drawing Sheets

(56) References Cited

U.S. PATENT DOCUMENTS

| | | | |
|---|---|---|---|
| 2007/0245386 A1* | 10/2007 | Morley | G11B 20/0021 725/78 |
| 2012/0158988 A1* | 6/2012 | Fatehpuria | H04L 65/4084 709/234 |
| 2014/0258531 A1* | 9/2014 | Sarda | G06Q 30/0637 709/225 |
| 2017/0019384 A1* | 1/2017 | Holtmanns | H04N 21/42623 |

* cited by examiner

DIGITAL RIGHTS MANAGEMENT FOR CINEMA SYSTEMS

CROSS-REFERENCE TO RELATED APPLICATION(S)

This application claims the benefit of U.S. Provisional Application No. 62/798,958, filed Jan. 30, 2019, the contents of which are incorporated by reference herein in their entirety.

BACKGROUND

Digital rights management (DRM) techniques provide protections for managing access rights to digital content. For example, in digital cinema where a server houses encrypted content for playback on a projector, the server may be allowed to provide the digital content to the projector for playback only if the server recognizes the projector as a trusted device. In this regard, a device may become a trusted device once it has the required security capabilities and protocols in place. Additionally, link encryption and other security parameters may also need to be present before the server is to provide the digital content to the projector. Some of these DRM techniques, while effective in providing robust content security, may also act as a technological barrier when the full (or a more complete) spectrum of specialized equipment that is needed to support the techniques is not available. An example of such an area is an electronic cinema systems (E-Cinema) environment where more generic equipment may be utilized, yet content playback and access protection are still desired.

SUMMARY

With respect to various embodiments disclosed herein, alternative DRM techniques are presented. According to various embodiments, features related to content protection are provided even when one or more particular trusted devices are not present and/or not available.

According to at least one embodiment, a method for controlling transmission of digital content stored at a server is disclosed. The method includes: receiving, at the server, session information from a device, the session information including information for authorizing the server to decrypt the digital content for transmission to a playback device; and determining, at the server, to decrypt the digital content for the transmission to the playback device, based on the session information. The method further includes: decrypting, at the server, the digital content for the transmission to the playback device, in response to determining to decrypt the digital content; and transmitting, at the server, the decrypted digital content to the playback device.

According to at least one embodiment, an apparatus for controlling transmission of stored digital content is disclosed. The apparatus includes a network communication unit configured to transmit and receive data; and one or more controllers. The one or more controllers are configured to: receive session information from a device, the session information including information for authorizing the apparatus to decrypt the digital content for transmission to a playback device; determine to decrypt the digital content for the transmission to the playback device, based on the session information; decrypt the digital content for the transmission to the playback device, in response to determining to decrypt the digital content; and transmit the decrypted digital content to the playback device.

According to at least one embodiment, a machine-readable non-transitory medium having stored thereon machine-executable instructions for controlling transmission of digital content stored at a server, is disclosed. The instructions include: receiving, at the server, session information from a device, the session information including information for authorizing the server to decrypt the digital content for transmission to a playback device; determining, at the server, to decrypt the digital content for the transmission to the playback device, based on the session information; decrypting, at the server, the digital content for the transmission to the playback device, in response to determining to decrypt the digital content; and transmitting, at the server, the decrypted digital content to the playback device.

According to at least one embodiment, a method for controlling transmission of digital content stored at a server is disclosed. The method includes: transmitting, at a device, a request to a network, the request requesting permission to playback the digital content, the request including credentials information identifying a user as a party or entity authorized to access the digital content. The method further includes: based on the request, receiving, at the device, session information from the network, the session information including information for authorizing the server to decrypt the digital content for transmission to a playback device; and transmitting, at the device, the session information to the server. Absent the transmission of the session information to the server, the server lacks capability to validate the playback device as a trusted device.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, as well as procedural, changes may be made without departing from the scope of the present invention. Wherever possible, the same reference numbers will be used throughout the drawings to refer to the same or similar parts.

Figure 1:
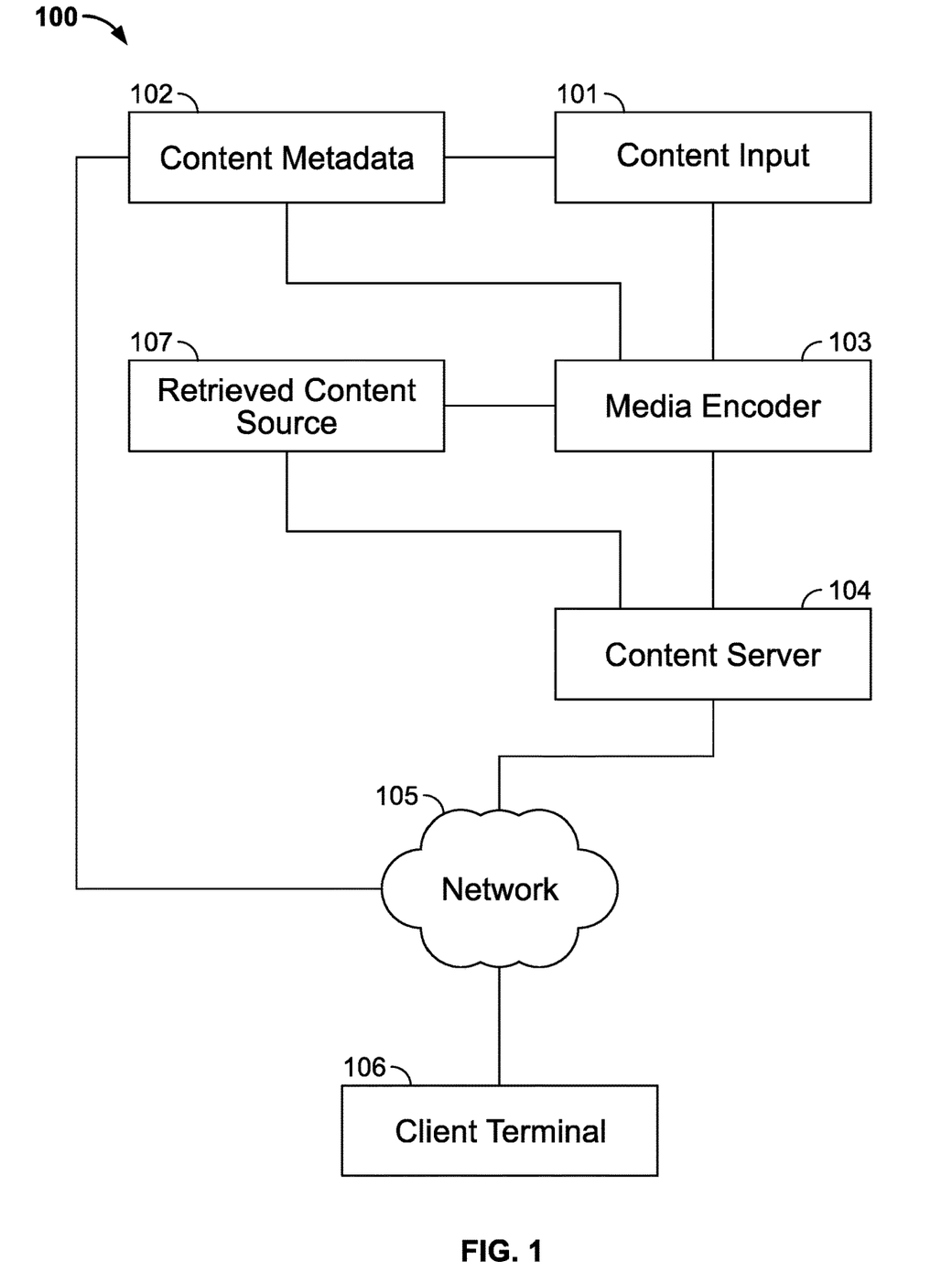
FIG. 1 is an illustration of a system for controlling transmission of digital content according to at least one embodiment.

Referring to FIG. 1, a system 100 for controlling transmission of digital content is illustrated. The system 100 may be configured to generate, encode, distribute, and/or store audio and/or video content, as well as receive and handle requests from a client terminal for presentation of the content. FIG. 1 will be discussed with respect to content that is suitable for delivery by wireless communication, etc. However, this disclosure is not to be limited thereto, and it will be understood by those of ordinary skill in the art that the features discussed herein are applicable to numerous other applications, platforms, and content delivery methods well known by those of ordinary skill in the art.

The system 100 may include a content input 101 in which content is created and/or generated for encoding and distribution. At the content input 101, a particular piece of content may be captured and/or uploaded. According to other embodiments of the system 100, the content may be otherwise provided from various sources including video (e.g., television broadcast, cable video distribution systems, satellite content distribution, Internet video, streaming video, mobile video distribution systems, digital video downloads, etc.). For purposes of brevity, examples of the content will be described herein mostly with respect to non-advertisement content or cinema-related content that is uploaded. However, it is understood that other types of content may be utilized. For example, although embodiments are described herein with reference to video content, it is understood that non-video or text-based content (such as interactive gaming, articles, e-books, etc.) may be utilized.

The embodiment of the system 100 may further include a content metadata source 102, which creates, gathers, compiles, and/or provides metadata related to the content for compilation and incorporation with the distributed content. For example, the metadata may describe thematic elements, underlying subject matter, and other data.

In the system 100, the content metadata source 102 and the content input 101 may be coupled to a media encoder 103, which is configured to encode the content, along with encoded metadata of the content. The encoded files are then made available for transmission (e.g., according to a particular schedule).

In some embodiments, the encoded files may correspond to commonly known compressed or uncompressed file formats including MPEG-1, MPEG-2, MPEG-4, H.264, AVC, DV, DVCAM, AVI, ASF, MOV, WMV, etc. However, it is understood that this disclosure is not limited thereto, and that numerous other compressions and formats may be utilized. The encoder may encode content and cause the generated encoded files to be distributed by a content server 104.

The media encoder 103 may also be configured to cause encoded media files to be concurrently stored in a memory associated with the content server 104. In some embodiments the media encoder 103 may also be configured to provide the encoded media files to a retrieved content source 107 where it may be stored for retrieval. In other embodiments, the encoded media files may be stored in a database external to the system, and the content server 104 or the retrieved content source 107 may be configured to store pointers or path descriptions for querying and/or requesting the encoded media files from the external database for later retrieval.

According to at least one embodiment, the encoded media files may be stored in the retrieved content source 107 along with metadata associated with the media files, including encoding metadata, closed captioning information, etc. In some embodiments, the retrieved content source 107 may also receive metadata directly from content metadata source 102, for association and storage with the encoded media files.

Returning to the content server 104 of the system 100, the content server 104 may include a plurality of content servers, each configured to handle requests for media files and to facilitate transmission of media files to requesting parties. As illustrated in FIG. 1, the content server 104 may be in communication with a client terminal 106 via a network 105.

The content server 104 may be configured to receive requests from the client terminal 106 for media content, and provide information to the client terminal 106 in response to the request. The information may include data associated with the encoded media content or address information for retrieving files of the encoded media content. It will be understood that content server 104 may be configured to provide information, data, and media content other than video, including audio, text, metadata, etc.

For example, content server 104 may be an enterprise server, a web server, a media server, a mobile data server, or any other type of server. In some embodiments, the content server 104 may be a computer or a computer program responsible for accepting requests (e.g., HTTP, RTSP, or other protocols that can initiate a media session) from client terminal 106 and serving client terminal 106 with streaming media. Although not shown in FIG. 1, embodiments are considered in which the client terminal 106 is configured to transmit and receive data directly to and from a separate web server, which in turn transmits and receives data transmissions to and from the content server 104 via a network such as the network 105.

In some embodiments, the content server 104 may be configured to provide the client terminal 106 with one or more manifest data files which include information related to the encoded media content. The manifest data file may be provided to the client terminal 106 in response to a request for encoded media content. The manifest may include information on suggested bandwidths for each encoding level, a location where each encoding data file is available such as an address, link, or other pointer to a location where the encoding file can be retrieved, and various metadata related to the encoded media content, such as event information, media type, aspect ratios, codec information, and the like. In some embodiments, the manifest may be provided in the form of an XML file. However, various implementations and file types which are well known to those of ordinary skill in the art are considered.

The network 105 may include various systems for distribution of content including any desired combination of hardwired and wireless communication links, including wide area networks (WAN), local area networks (LAN), wireless networks suitable for packet-type communications, over-the-air, satellite, cable, Internet, other network connection systems, etc., which implement networks and hardware known and used in the related art, including broadcast technologies, cable or satellite distribution systems, Internet protocol (IP), or other networked technologies, etc. Examples of the content include live and recorded television, movies, Internet streaming video and audio, music, radio or other audio-visual content, and the like. The system 100 may also include a gateway (not depicted), for example, a server, a router, a firewall server, a host, a proxy server, request redirector, etc.

The client terminal 106 may be connected to the network 105. The client terminal 106 may be a hardware component including software code and applications that are configured to allow the client terminal to communicate, transmit, request, and receive data packets, which may correspond to streaming media data, via the network 105. The client terminal 106 may include any terminal or system configured to receive a content signal, and, in some embodiments, the client terminal 106 may be configured to decode received encoded media files and prepare the content for presentation to a user via an output device such as a display. The output device may be implemented in the same hardware as the client terminal 106, or, in some embodiments, the output device may be implemented in a separate hardware or location from the client terminal 106 and be otherwise coupled and/or associated with the client terminal, such as by wired connection or wireless communication.

For example, the client terminal 106 may correspond to an Internet video streaming device, which is configured to request, transmit, and receive data packets corresponding to Internet streaming video, and the client terminal may be further configured to decode received data packets and prepare the media content to be displayed via a separate output, such as a television. In some embodiments, the client terminal 106 may also be configured to transmit information to one or more other aspects of the system 100 via the network 105, or similar network, regarding the content data received and decoded by the client terminal 106. Various other embodiments of the client terminal 106 may include televisions, desktop computers, laptop computers, tablet computers, mobile smartphones, personal media devices, wearable devices, set top box receivers, streaming Internet content devices, satellite television receivers, etc. In other embodiments, the client terminal 106 may be implemented in more than one connected device.

In an embodiment, the client terminal 106 may request, retrieve, and/or receive particular content from the content server 104 via the network 105. The request, retrieval, and/or the receiving of the particular content may correspond to a user of a client terminal selecting a particular piece(s) of content, entering a particular URL or address at the client terminal, or utilizing a content provider-specific application that is configured to connect to the content server 104 to transmit and receive instructions or requests for retrieval of specific content items. In some embodiments, the content server 104 may be configured to provide client terminal 106 with a single or multiple encoding streams of information, including audio/video content, as well as data associated with the audio/video content, such as metadata.

With respect to metadata, the client terminal 106 may request information (e.g., identifier) that is more generic (or generalized) than a particular identifier that identifies a discrete broadcast signal.

Some aspects of the present disclosure are directed to a method (or structure) for controlling transmission of digital content stored at a server (e.g., server 104) or from other devices—e.g., in a cinema system environment. According to one or more particular aspects, the digital content is to be received at a client terminal 106 including a playback device. However, the playback device is not a trusted device, e.g., from the perspective of the server.

Aspects of the present disclosure are directed toward controlling transmission of the digital content to such a playback device, such that at least a certain level of content security is provided. Although various embodiments will be described with reference to a cinema system environment (e.g., digital cinema environment), it is understood that features described herein also apply to other environments including those in which improved content security is sought.

Figure 2:
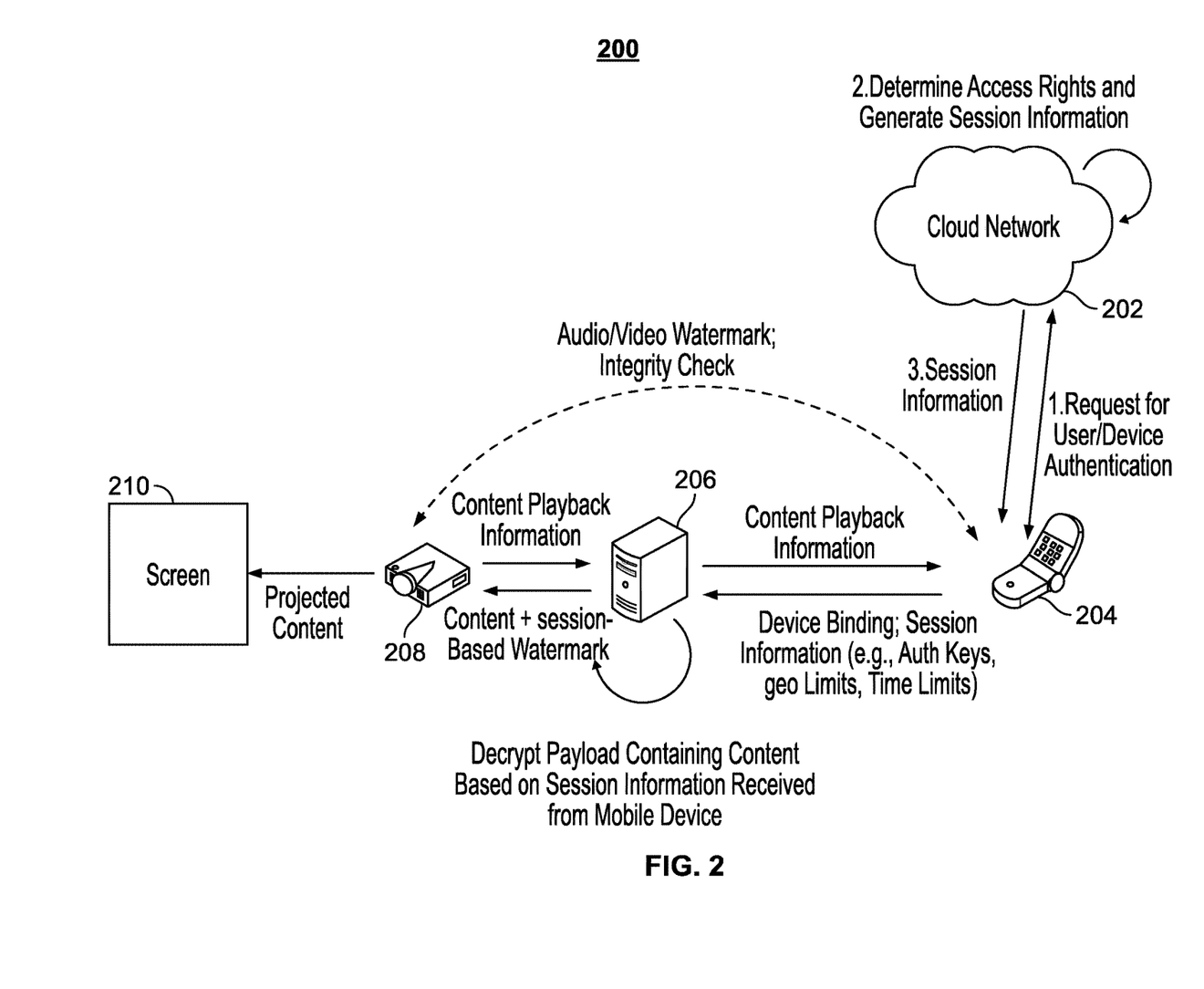
FIG. 2 illustrates a DRM system for controlling and tracking playback of digital content according to at least one embodiment.

FIG. 2 illustrates a DRM system 200 for controlling and tracking playback of digital content according to at least one embodiment. The digital content may include digital video content and/or digital audio content. Referring to FIG. 2, a server 206 stores encrypted digital content. The content may be caused to become available for playback on a playback device 208. For example, the playback device 208 may be a projector (or projection device) configured to project the content onto a screen 210. The connection between the playback device 208 and the server 206 may be a wired connection (e.g., High-Definition Multimedia Interface (HDMI) or Ethernet) or a wireless connection over Internet Protocol (IP) or Bluetooth.

In one or more embodiments, the connection between the playback device 208 and the server 206 may be an unsecured and/or unencrypted connection. In one or more embodiments, the playback device 208 is not a trusted device. For example, the playback device 208 is not a device that is recognized by the server 206, but rather a generic playback device. However—according to one or more embodiments, the server 206 need not verify that the playback device 208 has one or more required security capabilities, protocols, or identifications in place.

Such verification need not be performed by the server 206 before it decrypts the digital content for transmission to the playback device 208. For example—according to one or more embodiments, in order for the server 206 to decrypt the digital content for transmission, the server 206 first receives authentication information. The authentication information may be received from another device. This other device may be a mobile device 204 (e.g., a cellular phone, a tablet, a computing device, or any other electronic device). The authentication information includes information authorizing the server 206 to decrypt the digital content for transmission to the playback device 208. Although various embodiments are described herein with reference to a mobile device 204, it is understood that this other device may be a device having wired or wireless connectivity to the network 202 and/or to the server 206.

For example, a user (such as a theater owner, manager, or a projector operator at or within a cinema environment) may wish to playback digital content stored on the server 206. Using the mobile device 204, the user may transmit a request to a network 202, to request permission to playback the digital content. The request may include user credentials identifying the user as a party that is authorized to access the digital content. The request may include information identifying an organization with which the user is associated, if the organization is a party or entity that is authorized to playback the encrypted digital content.

The request may include location information (e.g., GPS coordinates) related to the user, to the mobile device 204, to the server 206, and/or to the playback device 208. The location information may also include information pertaining to a distance between the server 206 and the mobile device 204. The request may include timing information indicating one or more specific times or time periods for which playback is requested (or is to occur).

Based on the received request (the request transmitted by the user), the network 202 may determine whether the user is authorized to playback the digital content. For example, the determination may be based on content(s) of the request. According to one or more embodiments, the determination may be based on the user credentials identifying the user as a party that is authorized to access the digital content and/or the information identifying the organization with which the user is associated.

In addition (or alternatively), the determination may be further based on the location information received from the user—e.g., the geographical location of the user (as provided by the mobile device 204)—and/or the specific time(s) or time period(s) in which playback is requested. For example, playback may be authorized for a particular user in a particular geographical region but not another geographical region. Furthermore—even if playback in a specific geographical region is authorized, playback may be permitted only within a certain time window.

In addition (or alternatively), the determination may be based on the distance between the server 206 and the mobile device 204. By way of example, if the distance between the server 206 and the mobile device 204 is greater than a particular threshold (e.g., fifty feet), then the network 202 may refuse authorization. However—if the distance is less than or equal to the threshold, then the network 202 may grant authorization. Such authorization may be granted provided that other parameters are satisfied.

In addition (or alternatively), the user or the organization authorized to playback the encrypted digital content may be afforded or given not more than a certain number of playbacks. In such a situation, when the number of playbacks has been exceeded by the user or the organization (e.g., within a specific time period), the user or organization is no longer authorized to playback the digital content within that time period. In such a situation, the user or organization may request another number of playbacks by again requesting permission to playback the digital content (e.g., by transmitting a request using the mobile device 204).

If the network 202 determines that the user is authorized to playback the digital content, the network 202 may generate session information, and transmit the session information to the mobile device 204. In one or more embodiments, the session information includes one or more keys used to decrypt the content and/or to authenticate that the user is authorized to playback the content.

Alternatively (or in addition), the session information may include information corresponding to authentication information that was described earlier with reference to the request that was transmitted by the mobile device 204 to the network 202. For example, the session information may include a regional restriction(s) as to one or more specific locations at which the digital content may be played back, and/or timing restrictions indicating a specific time(s) or time period(s) at which the digital content may be played back. By way of example, the session information may include restrictions indicating that playback is to occur between the times of 5:00 PM and 8:00 PM in Mumbai, India. In this manner, a time period may indicate a period for which the session information is effectively valid. In another example, the session information may include playback radius information indicating a distance threshold between the server 206 and the mobile device 204, beyond which the server 206 will cease to decrypt content for playback. The playback radius information may be the same as or different from a distance included in the request from the mobile device 204 to the network 202. Also for example, the session information may include a counter that serves to limit the number of times digital content may be played back within a time period.

As noted earlier, the session information may include one or more keys used to decrypt the content and/or to authenticate that the user is authorized to playback the content. Alternatively (or in addition), the session information may include an updated set of keys for decrypting digital content stored at the server 206 that is different from the digital content that is being requested by the user. If the connection between the mobile device 204 and the server 206 is secure (or at least sufficiently secure), then including the updated keys in the session information may facilitate a secure (or more secure) updating by the network 202 of one or more keys stored at the server 206. Alternatively (or in addition), keys stored at the server 206 may be updated by physically (or manually) installing updated keys at the server 206. Such a physical installation may be performed, e.g., by a human operator.

The mobile device 204 may transmit the session information to the server 206. According to one or more embodiments—upon receiving the session information, the server 206 analyzes the one or more keys included in the session information to determine whether the mobile device 204 (e.g., the user of the mobile device 204) is authorized to enable playback. For example, if the server 206 determines that the keys included in the session information are invalid (e.g., the server 206 determines that the included keys do not match corresponding keys that were stored in the server 206 to help protect access of the digital content), then the server 206 may determine not to decrypt the digital content. However, if the server 206 determines that the keys included in the session information are valid, then the server 206 may proceed to determine whether other conditions are met before decrypting the content for playback. For example, the server 206 may determine whether geographical playback restriction/rules, timing playback restrictions/rules, and/or playback count limits included in the session information are satisfied before decrypting the digital content.

According to one or more embodiments, the server 206 may lack capabilities for long-(or longer-) range network connectivity. In this situation, the server 206 may be configured to operate only using shorter-range network connectivity technologies, such as Bluetooth, near-field communication (NFC), or other similar technologies. In this regard, the server 206 may determine to decrypt digital content for playback if the server 206 determines that it, itself, is located within a certain physical proximity of the mobile device 204. This determination by the server 206 may be based, for example, on locational information included in the session information, or, as another example, on a delay (e.g., round-trip travel time) of a signal(s) that the server receives back from the mobile device 204.

For example, if the server 206 is configured to operate only using Bluetooth communications (and/or similar technologies), then the server 206 may need to be within Bluetooth communication range of the mobile device 204 (e.g., less than forty feet depending on the Bluetooth class of the server 206) in order to receive the session information from the mobile device 204 and, potentially, decrypt digital content for playback.

As another example, the session information provided by the network 202 (e.g., as relayed by the mobile device 204) may specify that the server 206 be located within a specific proximity of the mobile device, in order for decryption to occur. For example, the session information may specify that the server 206 be within a predetermined distance (e.g., five feet) of the mobile device 204, in order for decryption of the digital content to be enabled.

If the server 206 determines that it, itself, is located outside of the predetermined distance, the server 206 may determine not to decrypt the digital content. Such a determination may be made even if, for example, it is determined that the keys included in the session information are otherwise valid. As another example, the server 206 may determine not to decrypt the digital content, even if the server 206 can detect the presence of the mobile device 204 using techniques other than Bluetooth (e.g., ranging techniques). By effectively requiring that the server 206 and the mobile device 204 be located within a certain distance of each other, content security may be improved. For example, such a requirement renders it less likely that playback will be conducted at the request of a user who is located outside of a geographical area that has been authorized by the network 202.

According to at least one embodiment—in order for decryption to occur, the server 206 may require that the mobile device 204 be located within a particular distance (or radius) of the server 206 at or during an initial interval (e.g., in interval in which at least an initial portion of the digital content is decrypted). However, according to at least one further embodiment, the mobile device 204 need not be located within the particular distance during the entire time that the server 206 is decrypting content and transmitting the decrypted content to the server 104. Alternatively—according to at least another embodiment, the server 206 may require that the mobile device 204 be located within the predetermined distance for the entire duration of the playback (e.g., during the entire time that the server 206 is decrypting content and transmitting the decrypted content to the server 104 for playback). In this situation—if it is determined that the mobile device 204 has moved (or is caused to have moved) beyond a threshold distance relative to the server 206, then the server 206 would cease decryption and playback of the digital content.

According to at least one embodiment, the server 206 may configure at least one aspect of the playback of the digital content, based on the distance between the server 206 and the mobile device 204. Such an aspect may be configured repeatedly (e.g., periodically) during playback of the digital content. For example, the server 206 may configure the resolution at which the playback is performed. As an example—if the mobile device 204 is determined to be located relatively close to (within five feet of) the server 206, then the server 206 may play back the digital content at a particular resolution (e.g., a higher or highest available visual resolution). However, if the mobile device 204 is determined to be located not as close to the server 206 (e.g., the mobile device 204 is located between five and ten feet of the server 206), then the server 206 may reduce the resolution at which the playback is performed, and periodically reduce the resolution as the distance is determined to have increased.

In addition (or alternatively), the server 206 may configure the audio volume at which the playback is performed. For example, the audio volume of the playback may be reduced or lowered as the distance between the server 206 and the mobile device 204 is determined to have increased. Ultimately, the server 206 may mute the volume as the distance is determined to have exceeded a particular threshold.

One or more embodiments are directed toward restricting the mobile device 204 from moving outside of a particular geographic region (to a different geographic region) after receiving the session information. According to at least one further embodiment, the session information is configured such that time period for playback is required to begin shortly after the mobile device 204 receives the session information from the network 202. For example, playback may be required to begin within thirty minutes to one hour after the session information has been received by the mobile device 204. In addition (or alternatively), together with the session information, the mobile device 204 may be required to send its current location information to the server 206. The session information may include the location information of the mobile device 204 at the earlier time that the mobile device 204 requested the session information (e.g., at the earlier time that the mobile device had sent a request to the network 202 requesting permission to playback the digital content). If a difference between the current location information of the mobile device 204 and the location information at the earlier time exceeds a certain threshold, then the server 206 may determine not to decrypt and playback the digital content.

According to one or more embodiments, as the server 206 decrypts and transmits the digital content to the playback device 208, a counter is incremented and stored. For example—each time a threshold portion (e.g., 10 minutes, 30 minutes, 60 minutes, etc.) of the digital content has been played back, the server 206 may increment a value of a counter and store the value as content playback information. The server 206 may provide the content playback information to the mobile device 204, e.g., together with the decrypted digital content. According to at least one particular embodiment—based on the received content playback information, the mobile device 204 may display an indicator indicating the remaining number of playbacks that are available within a particular session.

According to at least one particular embodiment, the playback device 208 may initiate and maintain such a playback counter, and store the playback counter as content playback information. The playback device 208 may provide the content playback information to the server 206, which may, in turn, transmit the content playback information to the mobile device 204.

According to at least one particular embodiment—if the value of the counter is less than the authorized (maximum) number of playbacks, then the server 206 may enable additional playbacks to occur (e.g., within the particular session). However—if the count is equal to (or greater than) the authorized number of playbacks, then the server 206 may cease decryption and playback (or the mobile device 204 may cause the server 206 to cease the decryption and playback).

According to one or more other embodiments, if a communication link (e.g., Bluetooth connection) is present between the playback device 208 and the mobile device 204, then the playback device 208 may provide the content playback information directly to the mobile device 204. According to one or more embodiments, the mobile device 204 may forward the content playback information to the network 202, which updates and maintains metrics regarding the actual number of times content is played back as compared to the authorized number of playbacks. Accordingly, the network 202 may determine the remaining number of playbacks that are available at the server 206 or the mobile device 204.

To provide an additional layer of security, when the server 206 decrypts the digital content, the server 206 may insert a session-based visual and/or audio watermark into the digital content before transmitting the content to the playback device 208. According to one or more embodiments, the server 206 may generate the watermark using session information obtained from the mobile device 204. For example, the watermark may be generated based on the one or more authorization keys, user information (e.g., user identifier information), organization information, geographical playback restriction information, time period for playback information, playback count information, and/or distance information between the server 206 and the mobile device 204.

If the generated watermark is an audio watermark, then the mobile device 204 may receive (e.g., at an internal microphone) the audio watermark via audio that is output by the playback device 208. In this situation, the mobile device 204 may verify that the correct audio watermark has been generated and provide confirmation of the same to the network 202. According to one or more embodiments, the mobile device 204 may transmit at least a portion of the audio watermark to the network 202 for independent confirmation by the network 202. If an incorrect audio watermark (or no audio watermark) is generated, then the mobile device 204 or the network 202 (via the mobile device 204) may halt decryption and playback at the server 206.

Similarly, if the generated watermark is a visual watermark, then the mobile device 204 may verify that the correct visual watermark has been generated and provide confirmation of the same to the network 202. According to one or more embodiments, the mobile device 204 may transmit the visual watermark to the network 202 for independent confirmation. If an incorrect visual watermark (or no visual watermark) is generated, then the mobile device 204 or the network 202 (via the mobile device 204) may halt decryption and playback at the server 206. Regarding the audio watermark and the visual watermark, verification and/or confirmation may be performed once during playback, at predetermined time intervals, or for a predetermined number of times.

In embodiments employing a session-based watermark, if any content is pirated from the server 206, the content may be readily tracked back to the user who had obtained authorization to decrypt and display the content, and to the time and place that the digital content was displayed.

Figure 3:
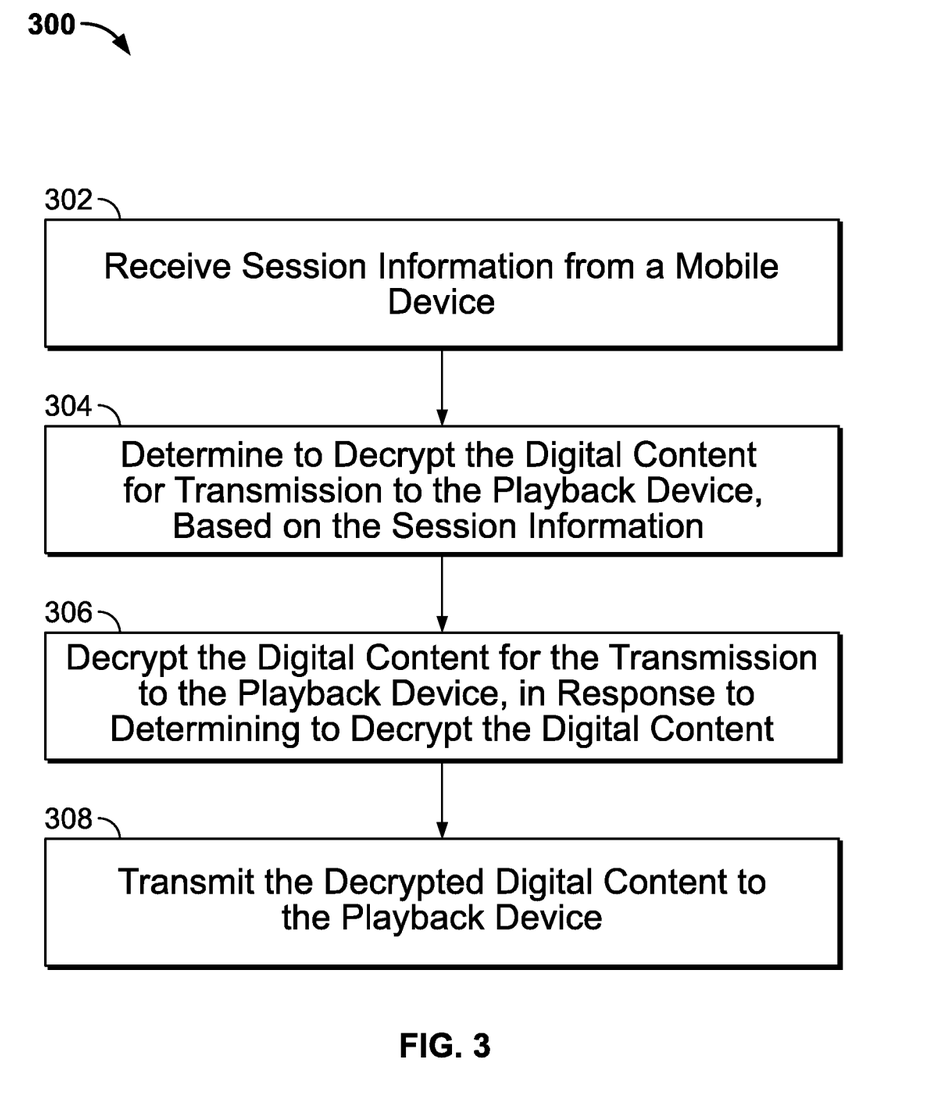
FIG. 3 is a flowchart illustrating a method of controlling transmission of digital content according to at least one embodiment.

FIG. 3 illustrates a flowchart of a method 300 for controlling transmission of digital content stored at a server according to at least one embodiment.

At block 302, the server receives session information from a device (e.g., a mobile device). The session information includes information authorizing the server to decrypt the digital content for transmission to a playback device. By way of example—with reference back to FIG. 2, the server 206 receives session information from the mobile device 204. The session information includes information authorizing the server 206 to decrypt the digital content for transmission to the playback device 208.

According to one or more particular embodiments, the session information includes one or more decryption keys or authentication keys.

According to one or more particular embodiments, the mobile device includes a mobile telephone. In addition (or alternatively), the playback device includes a projector (e.g., a cinema projector).

At block 304, the server determines to decrypt the digital content for the transmission to the playback device, based on the session information. By way of example—with reference back to FIG. 2, the server 206 determines to decrypt the digital content for transmission to the playback device 208, based on the session information.

According to one or more particular embodiments— absent the determination to decrypt the digital content based on the session information, the server lacks capability to validate the playback device as a trusted device.

The server may determine to decrypt the digital content based on the one or more decryption keys or authentication keys. In addition (or alternatively), the server may determine to decrypt the digital content further based on a distance between the server and the mobile device, a timing at which the decryption is requested, and/or a threshold number of authorized playbacks.

For example—with reference back to FIG. 2, the server 206 may further determine to decrypt the digital content based on a detected or determined distance between the server 206 and the mobile device 204 being less than a predetermined threshold (e.g., five feet).

At block 306, the server decrypts the digital content for the transmission to the playback device, in response to determining to decrypt the digital content. By way of example—with reference back to FIG. 2, the server 206 decrypts the digital content for the transmission to the playback device 208, in response to determining to decrypt the digital content.

Here, the server may also include a session-based watermark in the decrypted digital content.

At block 308, the server transmits the decrypted digital content to the playback device. By way of example—with reference back to FIG. 2, the server 206 transmits the decrypted digital content to the playback device 208.

Aspects of various embodiments disclosed herein are directed to providing more flexible content protection. Unlike some DRM systems, systems according to embodiments disclosed herein provide features relating to content protection even when one or more particular trusted devices are not present and/or not available. For example, according to various embodiments disclosed, the network 202 and the server 206 may be trusted entities, with respect to each other. However, the playback device 208 and the mobile device 204 may not be trusted devices, from the perspective of the network 202 and/or the server 206. For example, the playback device 208 and/or the mobile device 204 may not include any specialized components. For example, the playback device 208 and/or the mobile device 204 may not include any pre-installed keys or special hardware for decrypting the digital content on the server 206.

According to at least one embodiment, the mobile device 204 effectively becomes a trusted device and receives the key or session information only after it has been authenticated by the network 202, e.g., for a particular session. Once that session expires, re-authentication with the network 202 may be required. According to at least one further embodiment, the session information transmitted by the network 202 may also be encrypted, and the mobile device 204 need not be able to decrypt the session information. Instead, the mobile device 204 may serve as a router or packet forwarding device that forwards the session information to the server 206 and facilitates communication between the server 206 and the network 202.

According to one or more embodiments, to allow for greater flexibility, if the user expects that the mobile device 204 will not have connectivity (e.g., connectivity to the network 202) close to the time when the user needs to enable decryption and playback via the server 206, then the user may use the mobile device 204 to pre-request session information at an earlier time. For example, the mobile device 204 may obtain the session information ahead of time, store the session information as a package, and provide the session information to the server 206 at a later time. The server 206 may recognize that the session information is stored in a pre-requested package and authorize the digital content for decryption and playback. In some aspects, when a pre-requested package is sent to the server 206, the server 206 may decrypt the digital content for playback at a maximum resolution, or at a reduced resolution relative to the maximum resolution.

As previously described, in at least some embodiments, the client terminal, the encoder, the content server, the web servers, or other aspects of the described system (e.g., system 100 of FIG. 1, system 200 of FIG. 2) may include one or more software or hardware computer systems and may further include (or may be operably coupled to) one or more hardware memory systems for storing information including databases for storing, accessing, and querying various content, encoded data, shared addresses, metadata, etc. In hardware implementations, the one or more computer systems incorporate one or more computer processors and controllers.

The components of various embodiments described herein may each include a hardware processor of the one or more computer systems, and, in one embodiment, a single processor may be configured to implement the various components. For example, in one embodiment, the encoder, the content server, and the web server, or combinations thereof, may be implemented as separate hardware systems, or may be implemented as a single hardware system. The hardware system may include various transitory and non-transitory memory for storing information, wired and wireless communication receivers and transmitters, displays, and input and output interfaces and devices. The various computer systems, memory, and components of the system may be operably coupled to communicate information, and the system may further include various hardware and software communication modules, interfaces, and circuitry to enable wired or wireless communication of information.

Figure 4:
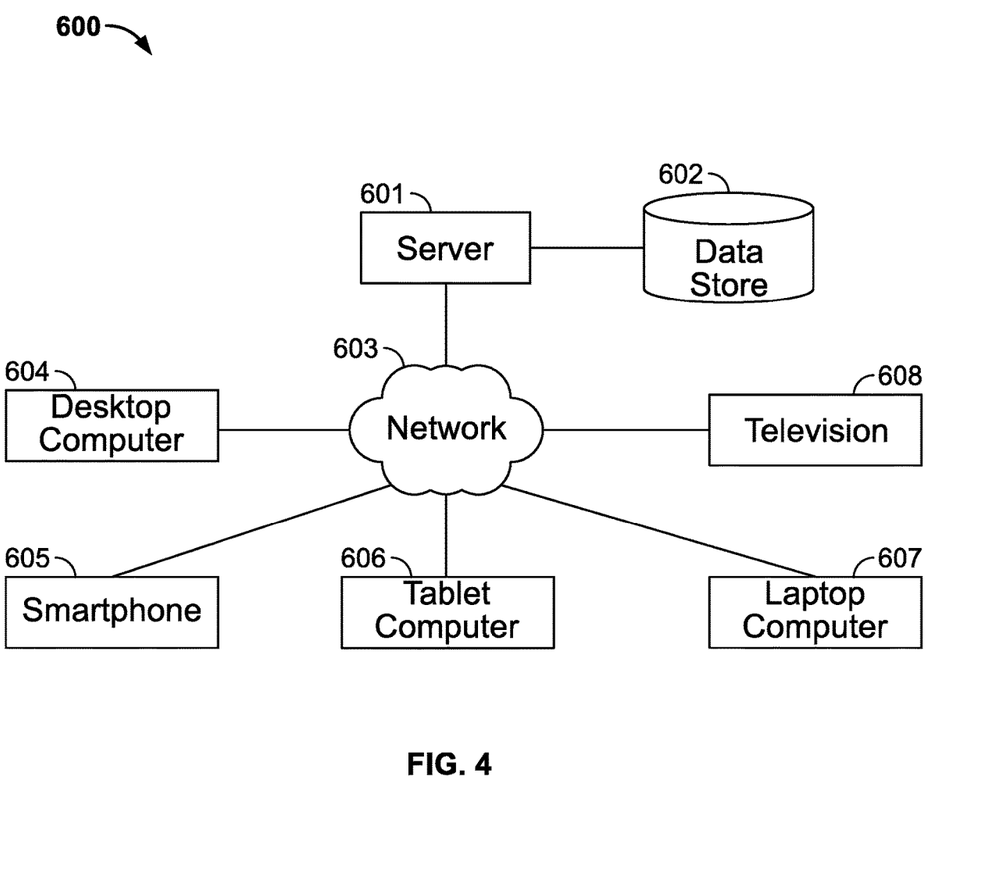
FIG. 4 is an illustration of a computing environment according to at least one embodiment.

In selected embodiments, features and aspects described herein may be implemented within a computing system 600, as shown in FIG. 4, which may include one or more computer servers 601. The server 601 may be operatively coupled to one or more data stores 602 (e.g., databases, indexes, files, or other data structures). The server 601 may connect to a data communication network 603 including a local area network (LAN), a wide area network (WAN) (e.g., the Internet), a telephone network, a satellite or wireless communication network, or some combination of these or similar networks.

One or more client devices 604, 605, 606, 607, 608 may be in communication with the server 601, and a corresponding data store 602 via the data communication network 603. Such client devices 604, 605, 606, 607, 608 may include, for example, one or more laptop computers 607, desktop computers 604, smartphones and mobile phones 605, tablet computers 606, televisions 608, or combinations thereof. In operation, such client devices 604, 605, 606, 607, 608 may send and receive data or instructions to or from the server 601 in response to user input received from user input devices or other input. In response, the server 601 may serve data from the data store 602, alter data within the data store 602, add data to the data store 602, or the like, or combinations thereof.

In selected embodiments, the server 601 may transmit one or more media files including audio and/or video content, encoded data, generated data, and/or metadata from the data store 602 to one or more of the client devices 604, 605, 606, 607, 608 via the data communication network 603. The devices may output the audio and/or video content from the media file using a display screen, projector, or other display output device. In certain embodiments, the system 600 configured in accordance with features and aspects described herein may be configured to operate within or support a cloud computing environment. For example, a portion of, or all of, the data store 602 and server 601 may reside in a cloud server.

Figure 5:
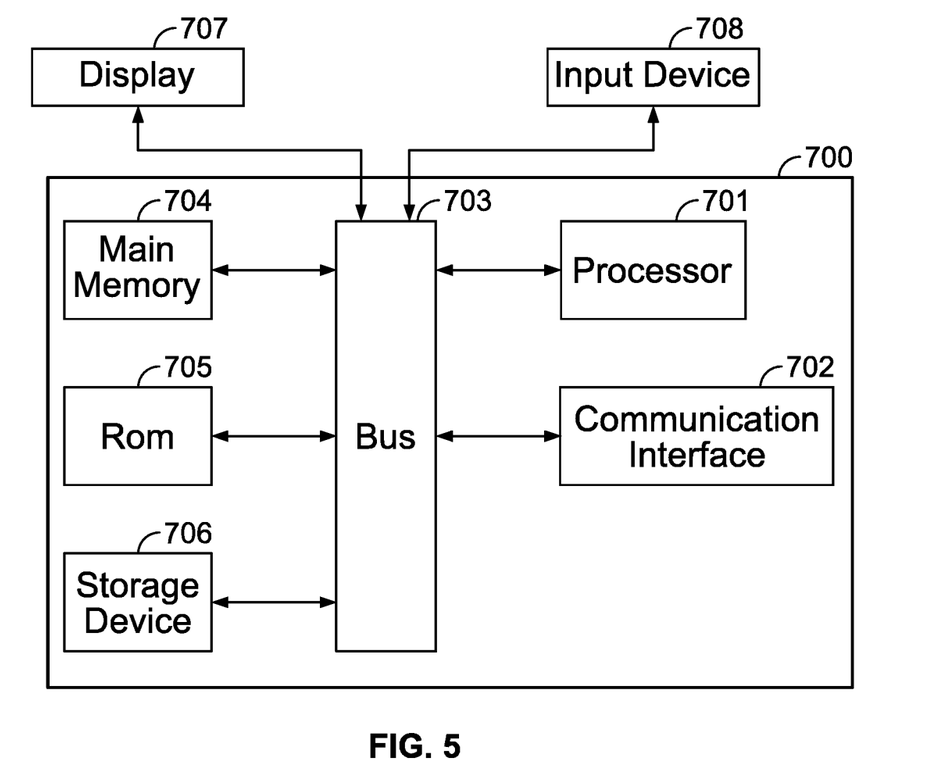
FIG. 5 is a block diagram of a device according to at least one embodiment.

With reference to FIG. 5, an illustration of an example computer 700 is provided. One or more of the devices 604, 605, 606, 607, 608 of the system 600 may be configured as or include such a computer 700. In addition, one or more components of the system 100 of FIG. 1 or of the system 200 of FIG. 2 may be configured as or include the computer 700.

In selected embodiments, the computer 700 may include a bus 703 (or multiple buses) or other communication mechanism, a processor 701, main memory 704, read only memory (ROM) 705, one or more additional storage devices 706, and/or a communication interface 702, or the like or sub-combinations thereof. Embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

The bus 703 or other communication mechanism, including multiple such buses or mechanisms, may support communication of information within the computer 700. The processor 701 may be connected to the bus 703 and process information. In selected embodiments, the processor 701 may be a specialized or dedicated microprocessor configured to perform particular tasks in accordance with the features and aspects described herein by executing machine-readable software code defining the particular tasks. Main memory 704 (e.g., random access memory—or RAM—or other dynamic storage device) may be connected to the bus 703 and store information and instructions to be executed by the processor 701. Main memory 704 may also store temporary variables or other intermediate information during execution of such instructions.

ROM 705 or some other static storage device may be connected to a bus 703 and store static information and instructions for the processor 701. The additional storage device 706 (e.g., a magnetic disk, optical disk, memory card, or the like) may be connected to the bus 703. The main memory 704, ROM 705, and the additional storage device 706 may include a non-transitory computer-readable medium holding information, instructions, or some combination thereof—for example, instructions that, when executed by the processor 701, cause the computer 700 to perform one or more operations of a method as described herein. The communication interface 702 may also be connected to the bus 703. A communication interface 702 may provide or support two-way data communication between the computer 700 and one or more external devices (e.g., other devices contained within the computing environment).

In selected embodiments, the computer 700 may be connected (e.g., via the bus 703) to a display 707. The display 707 may use any suitable mechanism to communicate information to a user of a computer 700. For example, the display 707 may include or utilize a liquid crystal display (LCD), light emitting diode (LED) display, projector, or other display device to present information to a user of the computer 700 in a visual display. One or more input devices 708 (e.g., an alphanumeric keyboard, mouse, microphone) may be connected to the bus 703 to communicate information and commands to the computer 700. In selected embodiments, one input device 708 may provide or support control over the positioning of a cursor to allow for selection and execution of various objects, files, programs, and the like provided by the computer 700 and displayed by the display 707.

The computer 700 may be used to transmit, receive, decode, display, etc. one or more video files. In selected embodiments, such transmitting, receiving, decoding, and displaying may be in response to the processor 701 executing one or more sequences of one or more instructions contained in main memory 704. Such instructions may be read into main memory 704 from another non-transitory computer-readable medium (e.g., a storage device).

Execution of sequences of instructions contained in main memory 704 may cause the processor 701 to perform one or more of the procedures or steps described herein. In selected embodiments, one or more processors in a multi-processing arrangement may also be employed to execute sequences of instructions contained in main memory 704. Alternatively, or in addition thereto, firmware may be used in place of, or in connection with, software instructions to implement procedures or steps in accordance with the features and aspects described herein. Thus, embodiments in accordance with features and aspects described herein may not be limited to any specific combination of hardware circuitry and software.

Non-transitory computer readable medium may refer to any medium that participates in holding instructions for execution by the processor 701, or that stores data for processing by a computer, and include all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, the communication interface 702 may provide or support external, two-way data communication to or via a network link. For example, the communication interface 702 may be a wireless network interface controller or a cellular radio providing a data communication network connection. Alternatively, the communication interface 702 may include a LAN card providing a data communication connection to a compatible LAN. In any such embodiment, the communication interface 702 may send and receive electrical, electromagnetic, or optical signals conveying information.

A network link may provide data communication through one or more networks to other data devices (e.g., client devices as shown in the computing system 600). For example, a network link may provide a connection through a local network of a host computer or to data equipment operated by an Internet Service Provider (ISP). An ISP may, in turn, provide data communication services through the Internet. Accordingly, a computer 700 may send and receive commands, data, or combinations thereof, including program code, through one or more networks, a network link, and communication interface 702. Thus, the computer 700 may interface or otherwise communicate with a remote server (e.g., server 601), or some combination thereof.

The various devices, modules, terminals, and the like described herein may be implemented on a computer by execution of software comprising machine instructions read from computer-readable medium, as discussed above. In certain embodiments, several hardware aspects may be implemented using a single computer; in other embodiments, multiple computers, input/output systems and hardware may be used to implement the system.

For a software implementation, certain embodiments described herein may be implemented with separate software modules, such as procedures and functions, each of which performs one or more of the functions and operations described herein. The software codes can be implemented with a software application written in any suitable programming language and may be stored in memory and executed by a controller or processor.

The foregoing described embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for controlling transmission of digital content stored at a server, the method comprising:
   receiving, at the server, session information from a device, the session information including information for authorizing the server to decrypt the digital content for transmission to a playback device;
   determining, at the server, to decrypt the digital content for the transmission to the playback device, based on the session information;
   decrypting, at the server, the digital content for the transmission to the playback device, in response to determining to decrypt the digital content; and
   transmitting, at the server, the decrypted digital content to the playback device,
   wherein transmitting the decrypted digital content to the playback device comprises enabling configuration of an aspect of playback of the decrypted digital content at the playback device based on a distance between the server and the device.

2. The method of claim 1,
   wherein, absent the determination to decrypt the digital content based on the session information, the server lacks capability to validate the playback device as a trusted device.

3. The method of claim 1, wherein:
   the session information comprises one or more decryption keys or authentication keys; and
   determining to decrypt the digital content comprises determining to decrypt the digital content based on the one or more decryption keys or authentication keys.

4. The method of claim 1,
   wherein determining to decrypt the digital content further comprises determining to decrypt the digital content further based on at least one of a distance between the server and the device, a timing at which the decryption is requested, or a threshold number of authorized playbacks.

5. The method of claim 1, wherein decrypting the digital content further comprises including a session-based watermark in the decrypted digital content before transmitting the decrypted digital content to the playback device.

6. The method of claim 1, wherein the aspect of the playback comprises a video resolution or an audio volume of the playback.

7. The method of claim 6, wherein configuring the aspect of the playback comprises decreasing the video resolution or the audio volume of the playback as the distance between the server and the device is determined to have increased.

8. The method of claim 1, wherein the device comprises a mobile telephone.

9. The method of claim 1, where the playback device comprises a cinema projector.

10. An apparatus for controlling transmission of stored digital content, the apparatus comprising:
- a network communication unit configured to transmit and receive data; and
- one or more controllers configured to:
  - receive session information from a device, the session information including information for authorizing the apparatus to decrypt the digital content for transmission to a playback device;
  - determine to decrypt the digital content for the transmission to the playback device, based on the session information;
  - decrypt the digital content for the transmission to the playback device, in response to determining to decrypt the digital content;
  - transmit the decrypted digital content to the playback device, and
- wherein the one or more controllers are further configured to transmit the decrypted digital content to the playback device by enabling configuration of an aspect of playback of the decrypted digital content at the playback device based on a distance between the apparatus and the device.

11. The apparatus of claim 10,
wherein, absent the determination to decrypt the digital content based on the session information, the apparatus lacks capability to validate the playback device as a trusted device.

12. The apparatus of claim 10, wherein:
the session information comprises one or more decryption keys or authentication keys; and
the one or more controllers are further configured to determine to decrypt the digital content based on the one or more decryption keys or authentication keys.

13. The apparatus of claim 10,
wherein one or more controllers are further configured to determine to decrypt the digital content further based on at least one of a distance between the apparatus and the device, a timing at which the decryption is requested, or a threshold number of authorized playbacks.

14. The apparatus of claim 10, wherein the one or more controllers are further configured to include a session-based watermark in the decrypted digital content before transmitting the decrypted digital content to the playback device.

15. The apparatus of claim 10, wherein the aspect of the playback comprises a video resolution or an audio volume of the playback.

16. The apparatus of claim 15, wherein the one or more controllers are further configured to configuring the aspect of the playback by decreasing the video resolution or the audio volume of the playback as the distance between the apparatus and the device is determined to have increased.

17. The apparatus of claim 10, wherein:
the device comprises a mobile telephone; and
the playback device comprises a cinema projector.

18. A machine-readable non-transitory medium having stored thereon machine-executable instructions for controlling transmission of digital content stored at a server, the instructions comprising:
- receiving, at the server, session information from a device, the session information including information for authorizing the server to decrypt the digital content for transmission to a playback device;
- determining, at the server, to decrypt the digital content for the transmission to the playback device, based on the session information;
- decrypting, at the server, the digital content for the transmission to the playback device, in response to determining to decrypt the digital content; and
- transmitting, at the server, the decrypted digital content to the playback device,
- wherein transmitting the decrypted digital content to the playback device comprises enabling configuration of an aspect of playback of the decrypted digital content at the playback device based on a distance between the server and the device.

19. A method for controlling transmission of digital content stored at a server, the method comprising:
- transmitting, at a device, a request to a network, the request requesting permission to playback the digital content, the request including credentials information identifying a user as a party or entity authorized to access the digital content;
- based on the request, receiving, at the device, session information from the network, the session information including information for authorizing the server to decrypt the digital content for transmission to a playback device, such that an aspect of playback of the decrypted digital content at the playback device is configured based on a distance between the server and the device; and
- transmitting, at the device, the session information to the server,
- wherein, absent the transmission of the session information to the server, the server lacks capability to validate the playback device as a trusted device.

* * * * *